United States Patent
Chen et al.

(10) Patent No.: US 8,711,007 B2
(45) Date of Patent: Apr. 29, 2014

(54) PERSPECTIVE RUNWAY SYSTEM

(75) Inventors: Sherwin S. Chen, Issaquah, WA (US); Jean M. Crane, Seattle, WA (US); Steven L. Fleiger-Holmes, Edmonds, WA (US); Wayne R. Jones, Bellevue, WA (US); Bruce P. Samuels, Shoreline, WA (US); Bechara J. Mallouk, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 979 days.

(21) Appl. No.: 12/815,747

(22) Filed: Jun. 15, 2010

(65) Prior Publication Data

US 2011/0304479 A1    Dec. 15, 2011

(51) Int. Cl.
*G08G 5/00* (2006.01)
*B64F 1/20* (2006.01)

(52) U.S. Cl.
USPC ........... 340/951; 340/971; 340/958; 340/945; 340/952; 340/947; 362/547; 362/545

(58) Field of Classification Search
USPC ................. 340/971, 951, 958, 945, 952, 947; 701/7, 3; 463/31; 362/547, 545
See application file for complete search history.

(56) References Cited

U.S. PATENT DOCUMENTS

| | | | |
|---|---|---|---|
| 2,376,208 A | 5/1945 | Tucker | |
| 4,291,294 A * | 9/1981 | Chase | 340/951 |
| 4,313,726 A * | 2/1982 | Chase | 434/42 |
| 4,792,906 A | 12/1988 | King et al. | |
| 6,028,535 A * | 2/2000 | Rizkin | 340/955 |
| 7,023,361 B1 * | 4/2006 | Wallace et al. | 340/952 |
| 7,216,069 B2 | 5/2007 | Hett | |
| 7,617,022 B1 * | 11/2009 | Wood et al. | 701/3 |
| 7,908,078 B2 | 3/2011 | He | |
| 2004/0044446 A1 * | 3/2004 | Staggs | 701/16 |
| 2004/0237224 A1 * | 12/2004 | Hutton | 14/71.5 |
| 2005/0190079 A1 * | 9/2005 | He | 340/945 |
| 2006/0004496 A1 | 1/2006 | Tucker et al. | |
| 2006/0083017 A1 * | 4/2006 | Wang et al. | 362/547 |
| 2006/0259232 A1 * | 11/2006 | Huthoefer et al. | 701/120 |
| 2007/0013557 A1 * | 1/2007 | Wang et al. | 340/945 |
| 2007/0241936 A1 * | 10/2007 | Arthur et al. | 340/958 |
| 2008/0007430 A1 * | 1/2008 | Wang et al. | 340/947 |
| 2008/0191903 A1 * | 8/2008 | Dubourg et al. | 340/958 |

(Continued)

FOREIGN PATENT DOCUMENTS

| | | |
|---|---|---|
| EP | 0670566 A2 | 9/1995 |
| EP | 2149783 A1 | 2/2010 |
| EP | 2234088 A2 | 9/2010 |
| EP | 2355071 A1 | 10/2011 |

OTHER PUBLICATIONS

U.S. Appl. No. 12/491,194, filed Jun. 24, 2009, Hammack.
PCT Search Report dated Oct. 7, 2011 regarding International Application No. PCT/US2011/036534, (14 pages).

*Primary Examiner* — Hoi Lau
(74) *Attorney, Agent, or Firm* — Yee & Associates, P.C.

(57) ABSTRACT

A method, apparatus, and computer program product for displaying information about runways. A runway for an aircraft is identified when the aircraft is within a selected distance of the runway. A number of graphical indicators are displayed on a display in a flight deck. The number of graphical indicators corresponds to a number of features of the runway present in a field of view for an eye reference point in the flight deck.

19 Claims, 11 Drawing Sheets

(56) References Cited

U.S. PATENT DOCUMENTS

| | | | |
|---|---|---|---|
| 2009/0210082 A1* | 8/2009 | Tartock et al. | 700/106 |
| 2009/0267800 A1 | 10/2009 | Hammack et al. | |
| 2009/0323320 A1* | 12/2009 | Goodman et al. | 362/153.1 |
| 2010/0057275 A1 | 3/2010 | Schilke et al. | |
| 2010/0057362 A1 | 3/2010 | Schilke et al. | |
| 2010/0113149 A1* | 5/2010 | Suddreth et al. | 463/31 |
| 2010/0231705 A1* | 9/2010 | Yahav et al. | 348/115 |
| 2010/0250030 A1* | 9/2010 | Nichols et al. | 701/7 |

* cited by examiner

PERSPECTIVE RUNWAY SYSTEM

BACKGROUND INFORMATION

1. Field

The present disclosure relates generally to aircraft and, in particular, to information systems for aircraft. Still more particularly, the present disclosure relates to a method and apparatus for presenting runway information in an aircraft.

2. Background

When landing or taking off from runways, pilots often rely on various types of markers associated with runways. These markers are associated with runways by being on or near the runways. For example, the markers may take the form of painted outlines for the runway, centerlines on the runways, billboards indicating the remaining amount of runway present, and/or other suitable types of markers.

When visibility conditions are low, other types of markers may be used. For example, at night, different types of lights may be used to identify the runway to the pilot of an aircraft. These lights may include, for example, runway identification lights, runway edge lights, a centerline lighting system, touchdown zone lights, and/or other suitable types of lights.

At some airports, these lights may be configured as an approach lighting system. An approach lighting system may be located at the end of a runway. This type of lighting system may include various light bars, strobe lights, or a combination of the two that extend outward from the runway. This lighting system may help the pilot identify the runway for landing during nighttime or other low-visibility conditions.

The amount of visibility at an airport affects when and how aircraft land. For example, airports without lighting systems may not allow takeoffs and landings when visibility conditions are lower, as opposed to airports that have lighting systems.

Further, different airports may have different types of lighting systems that provide guides to the pilot as they approach the runway. The different lighting systems may be designed for different amounts of visibility and/or ceiling levels. The lighting systems that provide the needed guidance to pilots at a lower visibility and/or ceiling level as compared to other lighting systems are often more expensive and more complex.

The ability to provide guidance to land on runways using lighting systems may vary at different airports, even though the same visibility conditions may be present at these airports. As a result, some aircraft may be unable to land at some airports, depending on the lighting system used when the lighting system at the airport does not provide the needed guidance at a particular visibility condition. Further, in providing the needed guidance using lighting systems, the expense and costs of these systems and maintenance for these systems increase operating expenses at airports.

Thus, it would be advantageous to have a method and apparatus that takes into account one or more of the issues discussed above, as well as other possible issues.

SUMMARY

In one advantageous embodiment, a method is provided for displaying information about runways. A runway for an aircraft is identified when the aircraft is within a selected distance of the runway. A number of graphical indicators are displayed on a display in a flight deck. The number of graphical indicators corresponds to a number of features of the runway present in a field of view for an eye reference point in the flight deck.

In another advantageous embodiment, an apparatus comprises a display in a flight deck, a storage device containing program code, and a processor unit configured to run the program code. The processor unit runs the program code to identify a runway for an aircraft when the aircraft is within a selected distance of the runway and to display a number of graphical indicators on the display in the flight deck. The number of graphical indicators corresponds to a number of features of the runway present in a field of view for an eye reference point in the flight deck.

In yet another advantageous embodiment, a computer program product for displaying information about runways comprises a computer recordable storage medium and program code, stored on the computer recordable storage medium. Program code is present for identifying a runway for an aircraft when the aircraft is within a selected distance of the runway. Program code is present for displaying a number of graphical indicators on a display in a flight deck. The number of graphical indicators corresponds to a number of features of the runway present in a field of view for an eye reference point in the flight deck.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
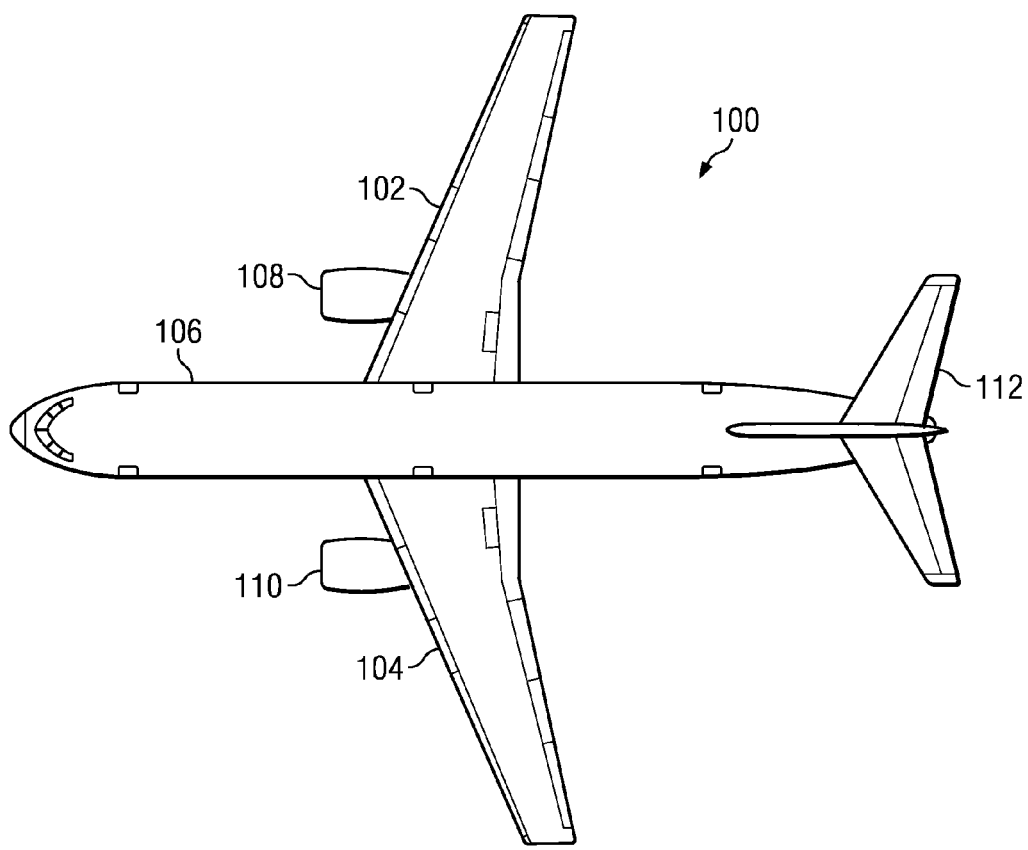
FIG. 1 is an illustration of an aircraft in which an advantageous embodiment may be implemented.

With reference now to the figures and, in particular, with reference to FIG. 1, an illustration of an aircraft is depicted in which an advantageous embodiment may be implemented. Aircraft 100 is an example of an aircraft in which an aircraft display environment may be implemented. In this illustrative example, aircraft 100 has wings 102 and 104 attached to body 106. Aircraft 100 includes wing-mounted engine 108, wing-mounted engine 110, and tail 112.

An aircraft display environment may be implemented in aircraft 100 in accordance with an advantageous embodiment. This environment may provide a pilot of aircraft 100 with information needed to land on a runway without relying on the runway infrastructure at an airport. As a result, in situations in which visibility conditions do not allow for clearance with a currently-available lighting system or in which a lighting system is not available, aircraft 100 may still have the information needed to land on the runway when using an advantageous embodiment.

The advantageous embodiments recognize and take into account a number of different considerations. For example, the advantageous embodiments recognize and take into account that the currently available infrastructure to provide information for landing may not be used in all visibility conditions. For example, as the ceiling at which visibility is present lowers, a lighting system that provides the information needed becomes more expensive and/or complex.

Further, the advantageous embodiments also recognize and take into account that even with currently-used lighting systems, visibility conditions can occur in which those lighting systems do not allow for an aircraft to obtain the information needed to land with the desired amount of accuracy.

The advantageous embodiments recognize and take into account that it would be desirable to have a system that allows an aircraft to land on a runway without relying on runway infrastructures. For example, the different advantageous embodiments recognize and take into account that it would be desirable to not require an aircraft to rely on a lighting system at an airport to provide the information used by the aircraft to land on the runway.

Thus, the different advantageous embodiments provide a method and apparatus for displaying information about runways. A runway for an aircraft is identified when the aircraft is within a selected distance of the runway. A number of graphical indicators are displayed on a display in the flight deck. The number of graphical indicators corresponds to a number of features of the runway as present in a field of view from an eye reference point in the flight deck.

Figure 2:
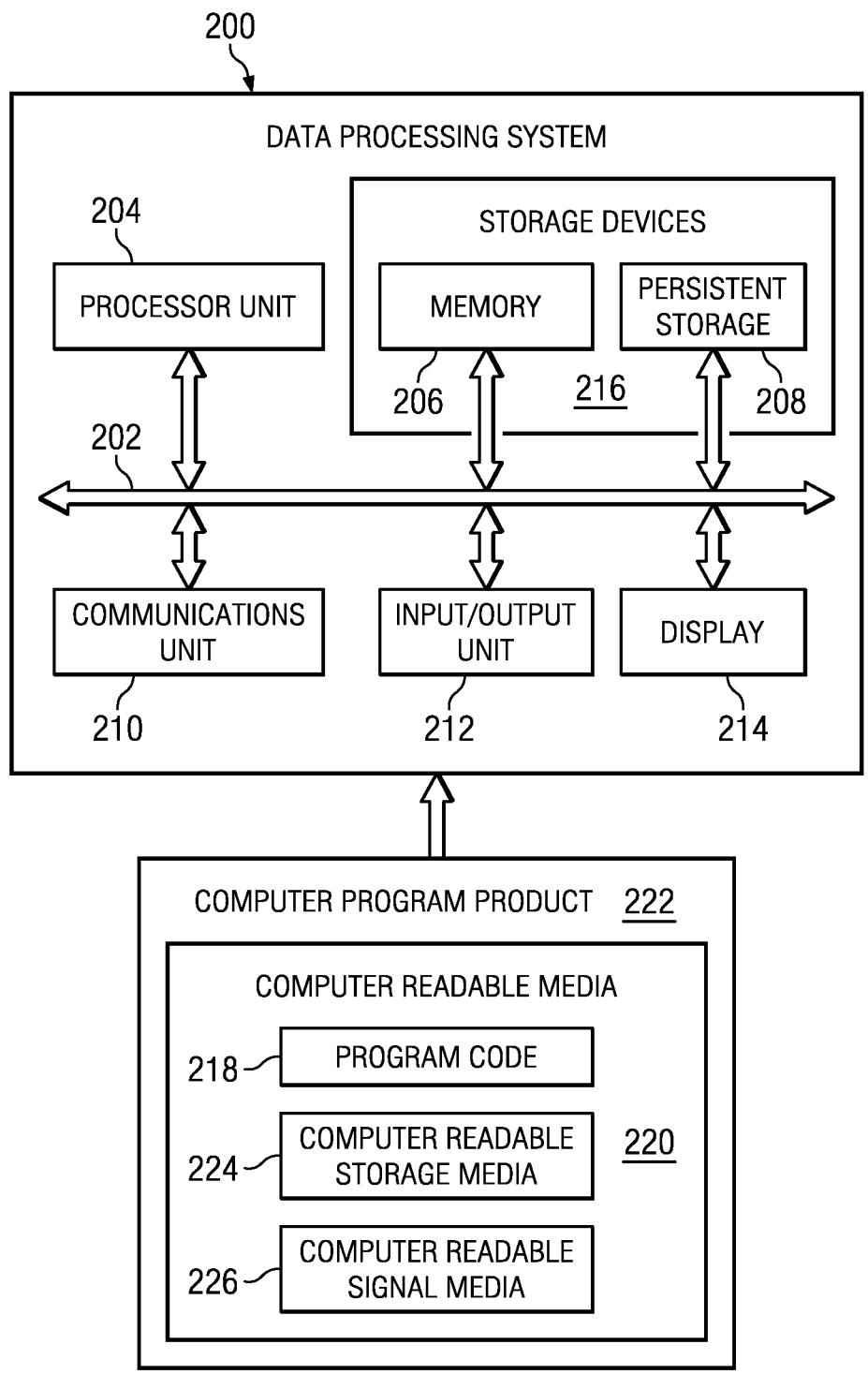
FIG. 2 is an illustration of a data processing system in accordance with an advantageous embodiment.

Turning now to FIG. 2, an illustration of a data processing system is depicted in accordance with an advantageous embodiment. In this illustrative example, data processing system 200 includes communications fabric 202, which provides communications between processor unit 204, memory 206, persistent storage 208, communications unit 210, input/output (I/O) unit 212, and display 214. Data processing system 200 may be used to implement different computers and data processing devices within aircraft 100 in FIG. 1.

Processor unit 204 serves to process instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226.

Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these illustrative examples, computer readable storage media 224 is a non-transitory computer readable storage medium.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different advantageous embodiments may be implemented in a data processing system including components in addition to or in place of those illustrated for data processing system 200.

Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

Figure 3:
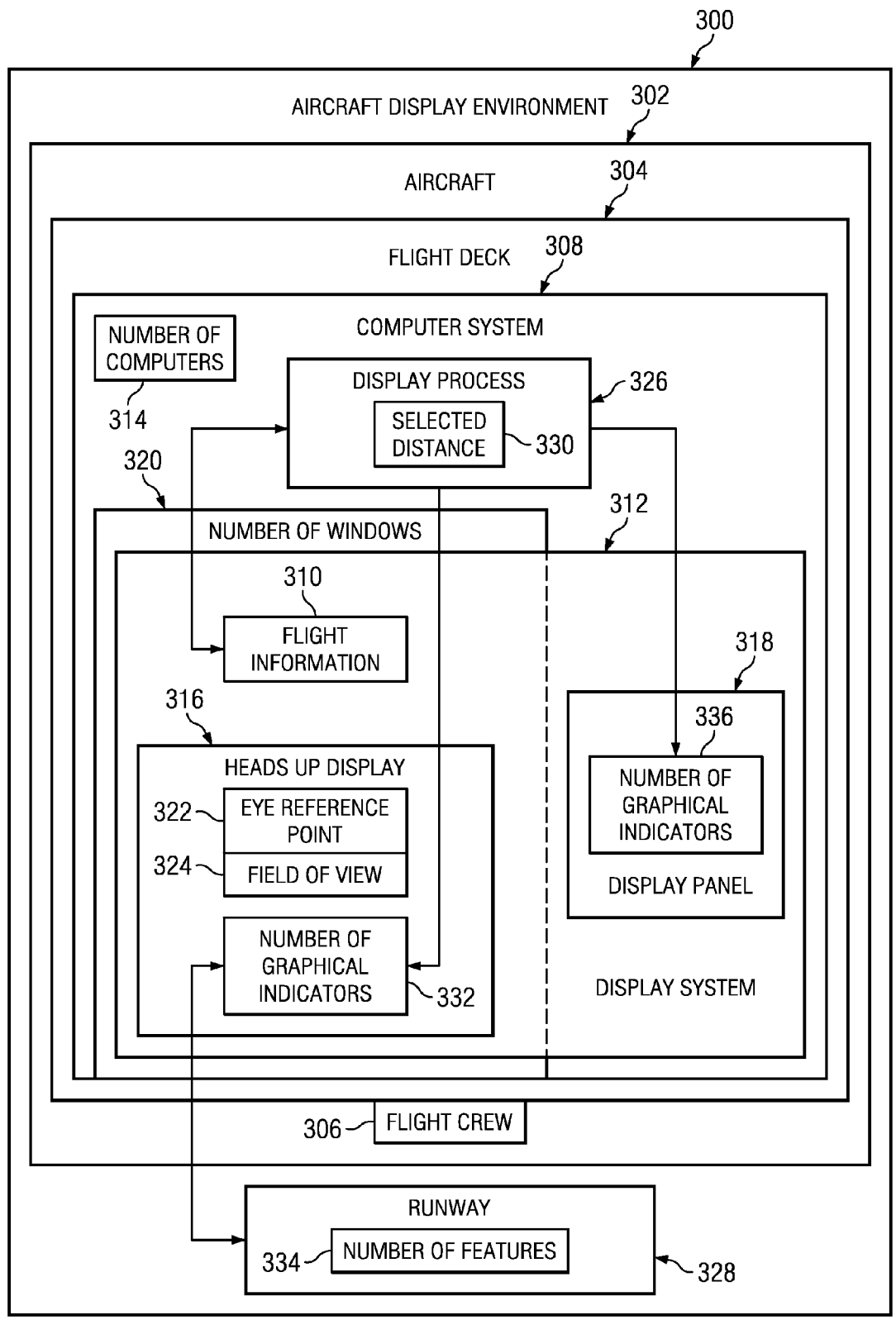
FIG. 3 is an illustration of an aircraft display environment in accordance with an advantageous embodiment.

With reference now to FIG. 3, an illustration of an aircraft display environment is depicted in accordance with an advantageous embodiment. Aircraft display environment 300 is an example of an aircraft display environment that may be implemented within aircraft 100 in FIG. 1.

In this example, aircraft display environment 300 includes flight deck 304 in aircraft 302. Aircraft 302 may be implemented using aircraft 100 in FIG. 1 or any other suitable aircraft. Flight deck 304 is a location in which flight crew 306 may be located to operate an aircraft.

Computer system 308 displays flight information 310 over display system 312 for use by flight crew 306. Computer system 308 takes the form of number of computers 314 in this example. Number of computers 314 may be implemented using data processing system 200 in FIG. 2. Number of computers 314 may be in communication with each other through different mechanisms, such as a network, wireless communications links, wired links, and other suitable communication mechanisms. In this illustrative example, computer system 308 is located within flight deck 304.

In these examples, display system 312 includes at least one of heads up display 316, display panel 318, and other suitable types of display devices. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C. In other examples, "at least one of" may be, for example, without limitation, two of item A, one of item B, and 10 of item C; four of item B and seven of item C; and other suitable combinations In these illustrative examples, heads up display 316 is presented in flight deck 304. In these illustrative examples, heads up display 316 is a transparent display that provides data without requiring a user to look away from the external view through number of windows 320 in flight deck 304. Heads up display 316 may be presented with respect to eye reference point 322.

In other words, heads up display 316 provides information relative to eye reference point 322. Eye reference point 322 is a position from which a user in flight crew 306 is intended to view information presented by heads up display 316.

For example, without limitation, eye reference point 322 may be defined as a point in space representing the position at which a pilot seated in flight deck 304 may have visibility for both the external view through number of windows 320 and the information presented by the instruments in flight deck 304. Eye reference point 322 may also be defined as a point in space representing the midpoint of the eyes of the pilot, while the pilot is seated in flight deck 304.

In these illustrative examples, heads up display 316 is designed and configured to provide information for eye reference point 322. Eye reference point 322 provides a field of view 324. Field of view 324 is the view that can be seen from eye reference point 322 through number of windows 320 in flight deck 304. In other words, any object that can be seen through number of windows 320 from eye reference point 322 is within field of view 324 for eye reference point 322.

In other illustrative examples, field of view 324 may include other views that cannot be seen from a user in flight crew 306 at eye reference point 322. These other portions may be seen if additional windows are present in flight deck 304.

In these illustrative examples, display process 326 runs on computer system 308 to generate flight information 310. Further, display process 326 identifies when aircraft 302 is within selected distance 330 of runway 328.

In these examples, selected distance 330 may be selected in a number of different ways. For example, selected distance 330 may be some distance, such as about five nautical miles, about 20 nautical miles, or some other suitable distance.

Additionally, selected distance 330 may be selected based on when runway 328 should be seen through number of windows 320 under optimal visibility conditions. In other advantageous embodiments, selected distance 330 may be a distance at which a descent phase, a landing phase, or some other phase of flight for aircraft 302 occurs.

When display process 326 determines that information about runway 328 should be presented, number of graphical indicators 332 may be selected or generated by display process 326 for presentation. Number of graphical indicators 332 is displayed on display system 312 in flight deck 304. In these examples, number of graphical indicators 332 corresponds to number of features 334 of runway 328 in field of view 324 for eye reference point 322.

A graphical indicator in number of graphical indicators 332 corresponds with a feature in number of features 334 when the graphical indicator is displayed where the feature would be seen from eye reference point 322 in these illustrative examples. In other words, the graphical indicator may overlay or sit over the feature of runway 328.

In these illustrative examples, number of graphical indicators 332 is displayed on heads up display 316. In other illustrative examples, number of graphical indicators 336 is additional graphical indicators in addition to number of graphical indicators 332 that may be displayed on display panel 318.

The display of number of graphical indicators 336 on display panel 318, however, does not correspond to number of features 334 of runway 328 present in field of view 324 for eye reference point 322. This presentation of number of graphical indicators 336 provides information that may be used by the pilot or other members of flight crew 306 while viewing other flight information presented on display panel 318. In these examples, display panel 318 may be for a primary flight display in display system 312.

The illustration of aircraft display environment 300 in FIG. 3 is not meant to imply physical or architectural limitations to the manner in which the different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, heads up display 316 may present information about runway 328 outside of field of view 324. In other words, the information may be presented on heads up display 316 even though runway 328 is not within field of view 324.

For example, flight crew 306 may not be able to see runway 328 from number of windows 320. Graphical indicators may still be displayed on displays inside of flight deck 304 even when runway 328 cannot be seen from number of windows 320. In other words, display panels or heads up display 316 may display graphical indicators within flight deck 304 in locations corresponding to where the features of runway 328 would be seen if a window was present.

Figure 4:
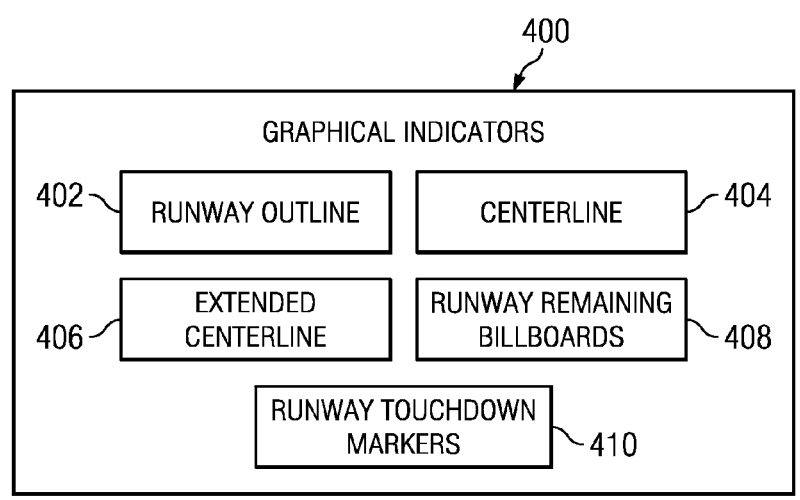
FIG. 4 is an illustration of types of graphical indicators in accordance with an advantageous embodiment.

With reference now to FIG. 4, an illustration of types of graphical indicators is depicted in accordance with an advantageous embodiment. In these depicted examples, number of graphical indicators 332 in FIG. 3 may take a number of different forms. Graphical indicators 400 are examples of graphical indicators that may be used in number of graphical indicators 332 in FIG. 3.

As depicted, graphical indicators 400 include runway outline 402, centerline 404, extended centerline 406, runway remaining billboards 408, runway touchdown markers 410, and other suitable types of graphical indicators.

Runway outline 402 corresponds to features of a runway in the form of edges. Centerline 404 is one or more graphical indicators that correspond to the centerline on the runway when centerline 404 is displayed on a heads up display.

Extended centerline 406 is one or more indicators that may be used to show an extension of the centerline for the runway beyond the runway itself. Runway remaining billboards 408 indicate an amount of runway remaining at different portions of the runway. Runway touchdown markers 410 indicate a location on the runway where the aircraft should touch the runway when landing.

The description of graphical indicators 400 in FIG. 4 is not meant to imply limitations to the manner in which other graphical indicators may be implemented. For example, in some illustrative examples, graphical indicators 400 also may include animation or moving images. Additionally, graphical indicators 400 also may include different colors, line types, fills, and other suitable types of indicators.

Figure 5:
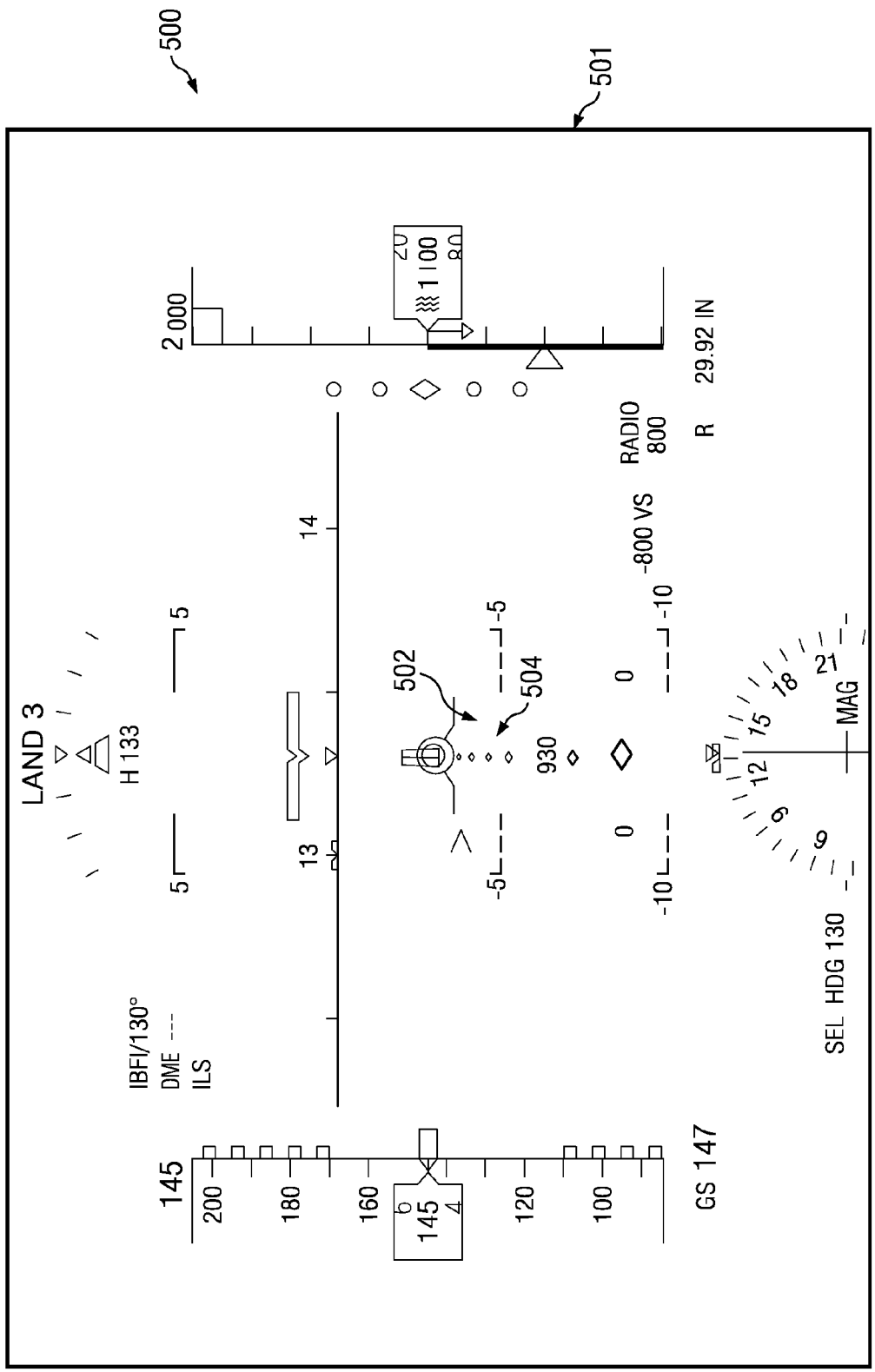
FIG. 5 is an illustration of flight information displayed on a display in accordance with an advantageous embodiment.

With reference now to FIG. 5, an illustration of flight information displayed on a display is depicted in accordance with an advantageous embodiment. In this illustrative example, display 500 is an example of a display within display system 312 in FIG. 3. In particular, display 500 takes the form of heads up display 501. Heads up display 501 is an example of one implementation for heads up display 316 in FIG. 3.

In this illustrative example, graphical indicators 502 are displayed on heads up display 501. Graphical indicators 502 include extended centerline 504. Extended centerline 504 is a number of graphical indicators that identify an extension of a centerline for a runway. In this example, this information is displayed with reference to an eye reference viewpoint for a viewer and presents information within the field of view for that eye reference point.

Figure 6:
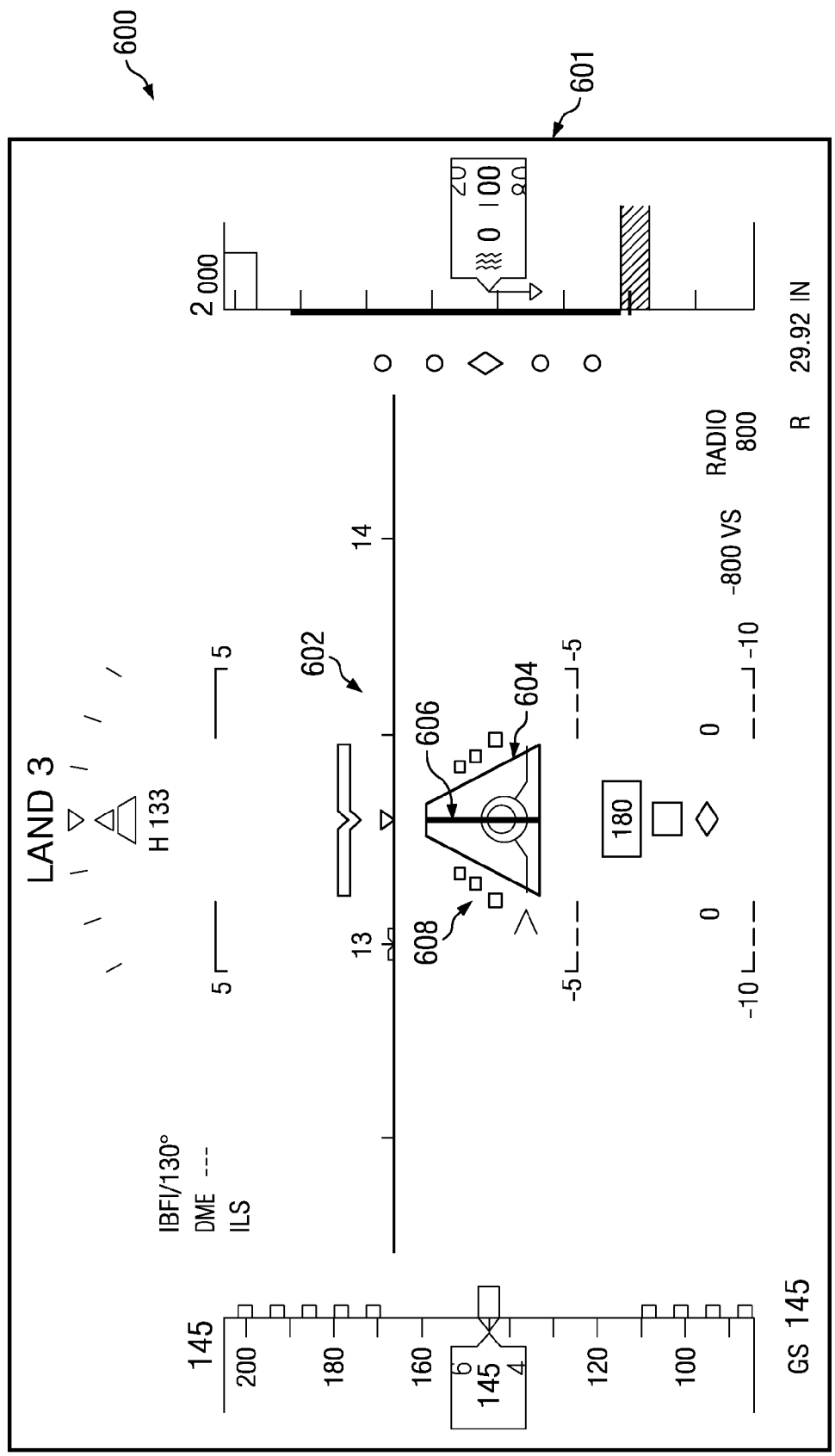
FIG. 6 is an illustration of flight information displayed on a display in accordance with an advantageous embodiment.

With reference now to FIG. 6, an illustration of flight information displayed on a display is depicted in accordance with an advantageous embodiment. In this example, display 600 is an example of a display within display system 312 in FIG. 3. In particular, display 600 takes the form of heads up display 601. Heads up display 601 is an example of one implementation for heads up display 316 in FIG. 3.

In this example, number of graphical indicators 602 is presented on display 600. Number of graphical indicators 602 includes runway outline 604 of the runway and centerline 606 for the runway. Further, number of graphical indicators 602 also includes runway remaining billboards 608. In this example, centerline 606 is displayed as a number of rectangles.

In some advantageous embodiments, the manner in which graphical indicators for centerline 606 are displayed may change as the distance to the runway changes. For example, centerline 606 may be displayed as a solid line until a first distance from the runway and as a number of rectangles after the first distance from the runway.

Figure 7:
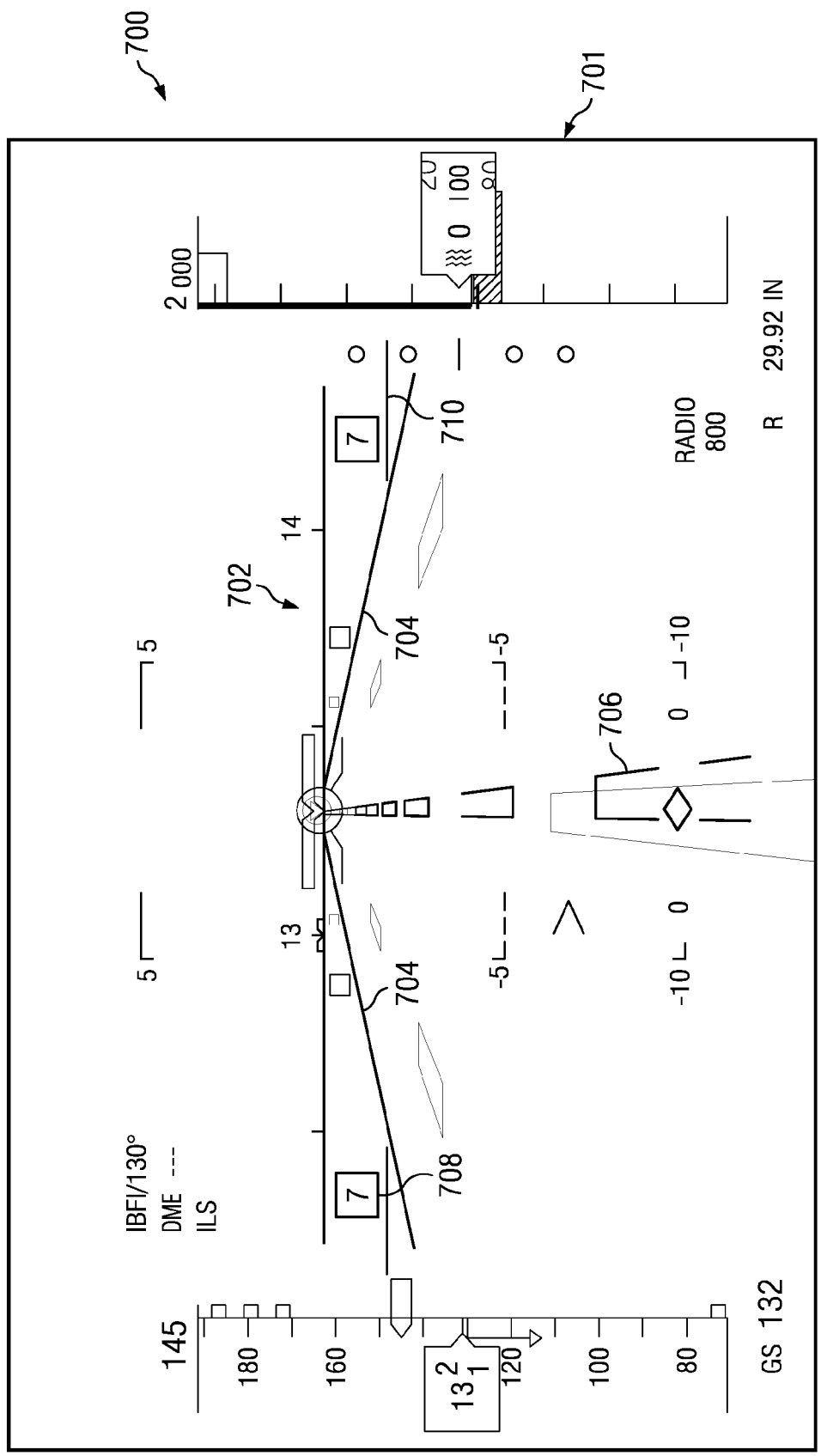
FIG. 7 is an illustration of flight information displayed on a display in accordance with an advantageous embodiment.

With reference now to FIG. 7, an illustration of flight information displayed on a display is depicted in accordance with an advantageous embodiment. In this example, display 700 is an example of a display within display system 312 in FIG. 3. In particular, display 700 takes the form of heads up display 701. Heads up display 701 is an example of one implementation for heads up display 316 in FIG. 3.

In this example, display 700 includes graphical indicators for a runway. Graphical indicators 702 include runway outline 704, centerline 706, runway remaining billboards 708, and runway touchdown markers 710.

Runway touchdown markers 710 indicate a location on the runway where the aircraft should touch the runway when landing. In this illustrative example, runway touchdown markers 710 are located about 1,000 feet from the runway threshold for the aircraft to touch down on the runway. A pilot may use these markers as a location to aim for touching down on the runway.

In this depicted example, centerline 706 is displayed in the form of rectangles that are not filled. This presentation of centerline 706 is used when the aircraft is closer to the runway as compared to where the aircraft is for the presentation in display 600 in FIG. 6.

Additionally, the rectangles for centerline 706 may be not filled when the aircraft is at a first distance from the runway. This distance may be with respect to a beginning of the runway, a point on the runway, or the end of the runway. For example, the first distance from the runway may be before the runway or on the runway.

Further, the rectangles for centerline 706 may be filled when the aircraft is at a second distance from the runway. The second distance from the runway may be before the runway or on the runway. In this manner, the operator may be alerted as to when the aircraft approaches the second distance from the runway.

Figure 8:
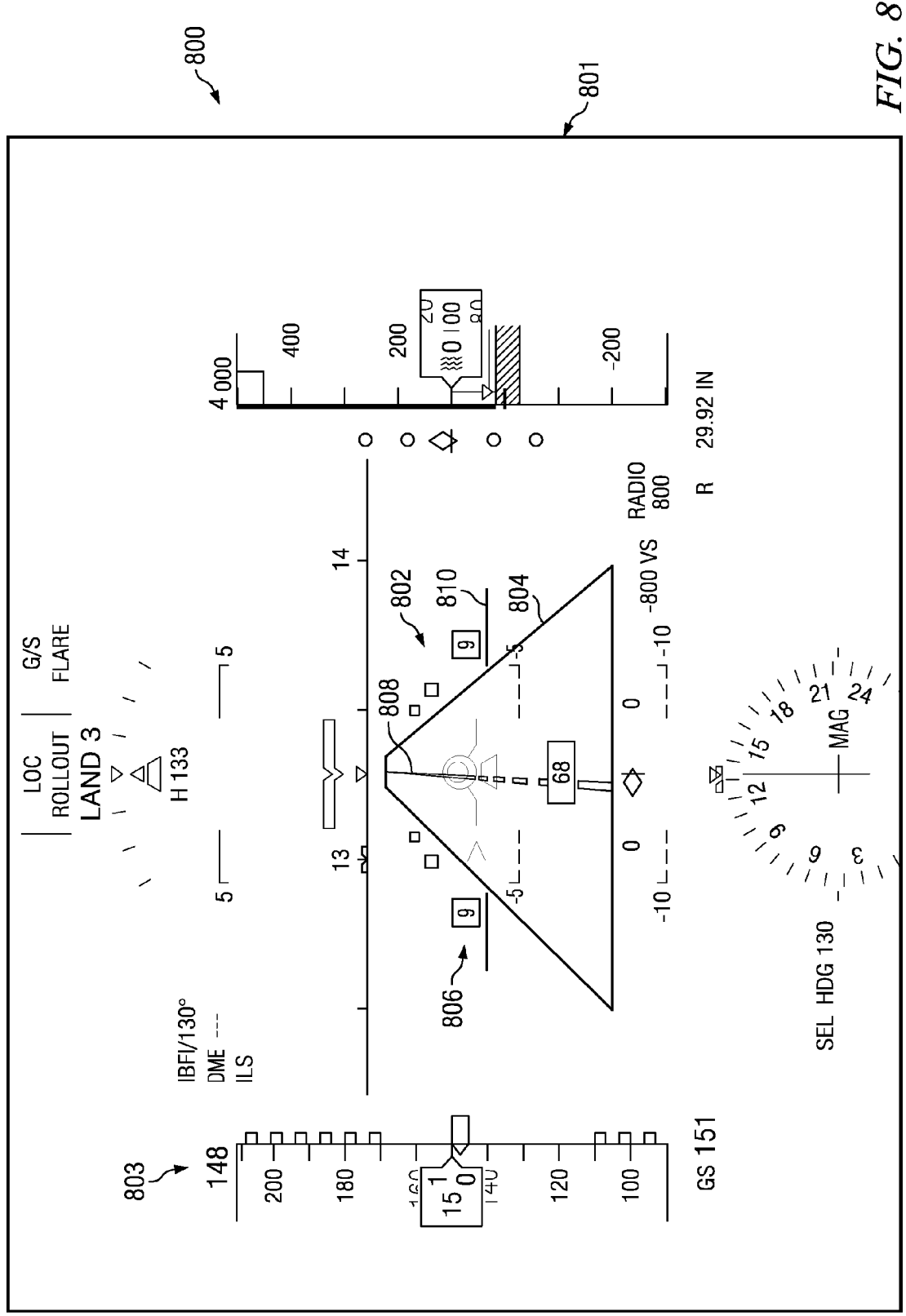
FIG. 8 is an illustration of flight information displayed on a display in accordance with an advantageous embodiment.

With reference now to FIG. 8, an illustration of flight information displayed on a display is depicted in accordance with an advantageous embodiment. In this example, display 800 is an example of a display within display system 312 in FIG. 3. In particular, display 800 takes the form of display panel 801. Display panel 801 is an example of one implementation for display panel 318 in FIG. 3.

As illustrated, number of graphical indicators 802 is presented in display 800 in addition to flight information 803. Number of graphical indicators 802 includes runway outline 804, runway remaining billboards 806, centerline 808, and runway touchdown markers 810. As depicted, centerline 808 is comprised of unfilled rectangles. The unfilled rectangles indicate that the aircraft is more than about 3,000 feet away from the runway.

This display of number of graphical indicators 802 provides a flight crew operator additional information about the runway that the aircraft is approaching in addition to other information normally provided on a primary flight display. In these examples, the display of number of graphical indicators 802 does not correspond to features on the runway.

In other examples, a video of the runway may be displayed with number of graphical indicators 802 displayed for corresponding features of the runway. For example, the video may be a video of what is seen through the windows of the flight deck. Number of graphical indicators 802 may be displayed over the video. In this manner, display 800 may present a view of the runway with number of graphical indicators 802 similar to the view of the runway with a number of graphical indicators on a heads up display.

Figure 9:
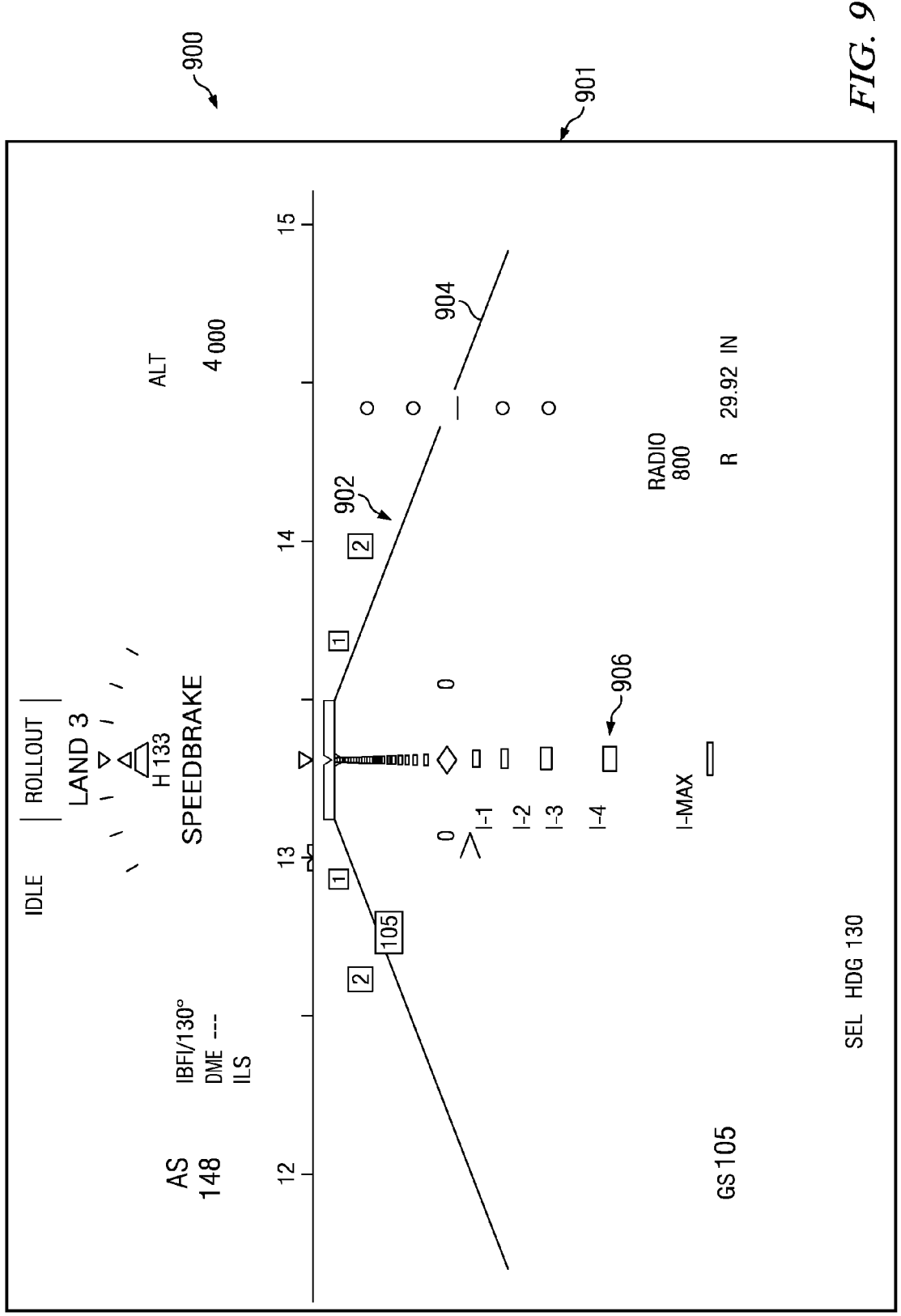
FIG. 9 is an illustration of a display in accordance with an advantageous embodiment.

With reference now to FIG. 9, an illustration of a display is depicted in accordance with an advantageous embodiment. In this example, display 900 is an example of a display within display system 312 in FIG. 3. In particular, display 900 takes the form of display panel 901. Display panel 901 is an example of one implementation for display panel 318 in FIG. 3.

As illustrated, number of graphical indicators 902 is presented in display 900. Number of graphical indicators 902 includes runway outline 904 and centerline 906. Centerline 906 takes the form of rectangles that alternate between filled and unfilled. This pattern of alternating between filled and unfilled rectangles for centerline 906 indicates that the aircraft is at a distance between about 3,000 feet and about 1,000 feet from the runway.

Figure 10:
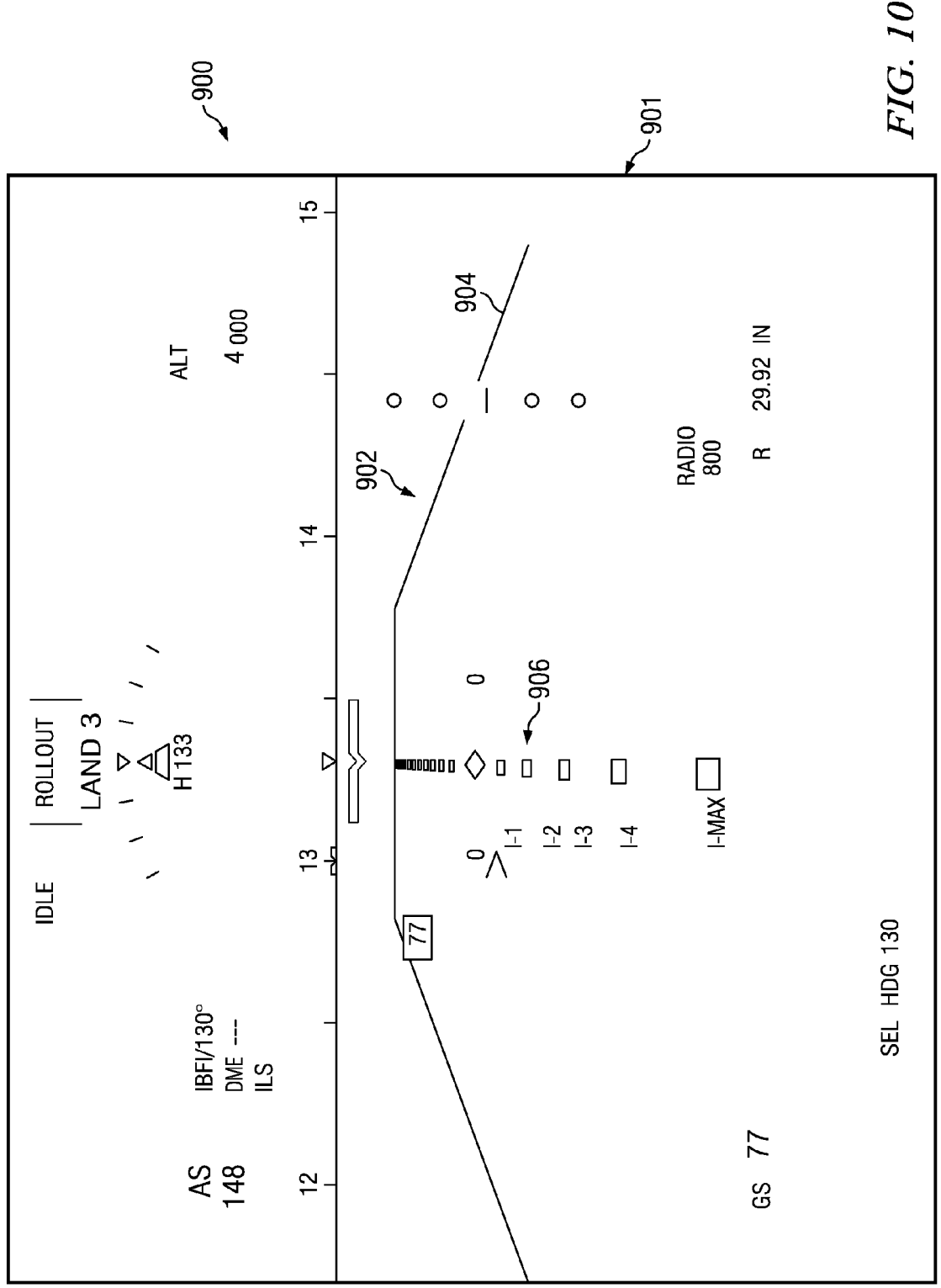
FIG. 10 is an illustration of a display in accordance with an advantageous embodiment.

With reference now to FIG. 10, an illustration of a display is depicted in accordance with an advantageous embodiment. As depicted in this example, display 900 from FIG. 9 presents centerline 906 in the form of filled rectangles. In this illustrative example, filled rectangles for centerline 906 indicate that the aircraft is at a distance of less than about 1,000 feet from the runway.

Figure 11:
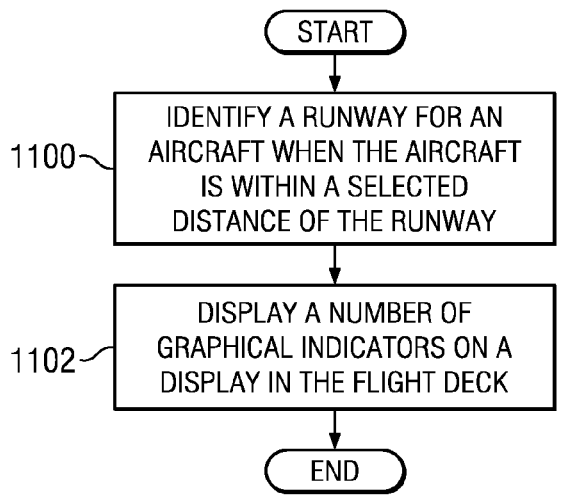
FIG. 11 is an illustration of a flowchart of a process for displaying information about runways in accordance with an advantageous embodiment.

With reference now to FIG. 11, an illustration of a flowchart of a process for displaying information about runways is depicted in accordance with an advantageous embodiment. The process illustrated in FIG. 11 may be implemented using display process 326 in FIG. 3.

The process begins by identifying a runway for an aircraft when the aircraft is within a selected distance of the runway (operation 1100). The process then displays a number of graphical indicators on a display in the flight deck (operation 1102), with the process terminating thereafter. The number of graphical indicators corresponds to a number of features of the runway present in a field of view for an eye reference point in the flight deck.

Operation 1102 may be performed or updated continuously as the distance and/or attitude of the aircraft changes with respect to the runway on the ground. In this manner, the process illustrated in FIG. 11 may be used to provide information for use by a flight crew to land an aircraft on a runway.

Figure 12:
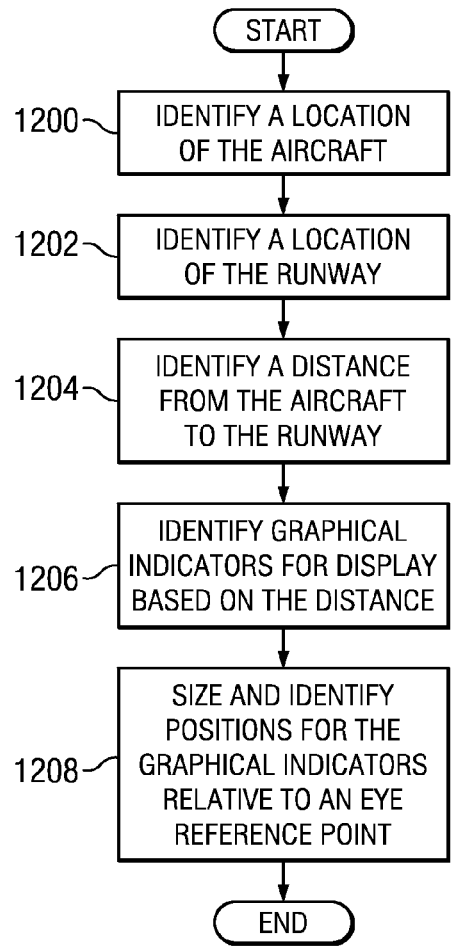
FIG. 12 is an illustration of a flowchart of a process for generating graphical indicators in accordance with an advantageous embodiment.

With reference now to FIG. 12, an illustration of a flowchart for generating graphical indicators is depicted in accordance with an advantageous embodiment. The process illustrated in FIG. 12 may be implemented in display process 326 to create graphical indicators.

In particular, the process illustrated in FIG. 12 creates graphical indicators and generates positions for displaying the graphical indicators to correspond to features of the runway relative to an eye reference point in a flight deck of an aircraft. In particular, this process may be used as part of the display operation in operation 1102 in FIG. 11.

The process begins by identifying a location of the aircraft (operation 1200). The location of the aircraft in operation 1200 may be identified in a number of different ways. For example, at least one of a global positioning system, an inertial guidance system, a ground-based radar system, and other suitable location systems may be used to identify the location of the aircraft.

The location of the runway is then identified (operation 1202). The location of the runway, in these examples, may be identified using a database. The database may identify the location of the runway as well as the location of various features of the runway.

The process then identifies a distance from the aircraft to the runway (operation 1204). Graphical indicators are then identified for display based on the distance (operation 1206). These graphical indicators may be of different types, such as those in FIG. 4. The particular types of graphical indicators selected may depend on how close the aircraft is to the runway and/or the phase of flight of the aircraft.

For example, in some distances, runway remaining billboards and centerlines may not be displayed, while an extended centerline may be displayed to the flight crew. At other distances, portions of the outline of the runway may not be displayed because the aircraft has passed those portions of the runway.

The process then sizes and identifies positions for the graphical indicators relative to an eye reference point (operation 1208), with the process terminating thereafter. This information may then be used to display the graphical indicators on the heads up display in the flight deck. The process illustrated in FIG. 12 may be repeated continuously for the duration of time that the number of graphical indicators is displayed on the heads up display.

Figure 13:
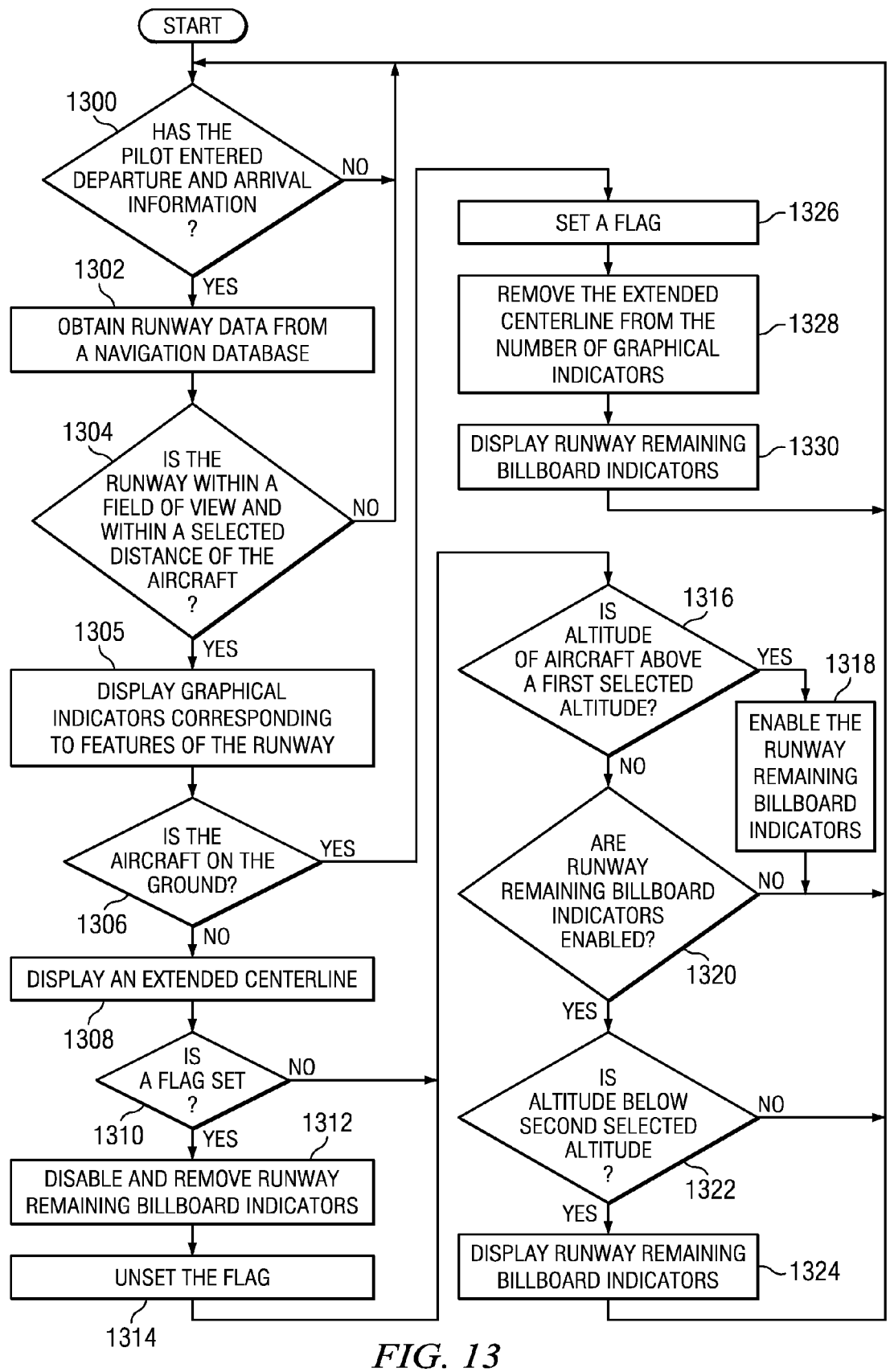
FIG. 13 is an illustration of a flowchart of a process for displaying information about runways in accordance with an advantageous embodiment.

With reference now to FIG. 13, an illustration of a process for displaying information about runways is depicted in accordance with an advantageous embodiment. This process is an example of one implementation for display process 326 in FIG. 3.

The process begins by determining whether the pilot has entered departure and arrival information (operation 1300). The arrival and departure information is used to identify the runway that is used by the aircraft. From the identification of the runway, runway data may be obtained. The runway data may include, for example, without limitation, dimensions for different features of the runway and locations for those features.

If the pilot has not entered this information, the process returns to operation 1300. If the information has been entered, the process then obtains runway data from a navigation database (operation 1302).

Thereafter, a determination is made as to whether the runway is within a field of view and within a selected distance of the aircraft (operation 1304). In these examples, the field of view is one based on the windows in the flight deck and the eye reference point. The selected distance in this example may be about 20 nautical miles. Of course, any distance may be used, depending on the particular implementation. In still other illustrative examples, the selected distance may be based on a phase of flight of the aircraft that occurs at some distance from the runway.

If the runway is not within the field of view and within the selected distance, the process returns to operation 1300 without showing graphical indicators for the runway.

If the runway is within the field of view, the process then displays graphical indicators corresponding to features of the runway (operation 1305). In operation 1305, the graphical indicators displayed include, for example, an outline of the runway and a centerline for the runway.

Next, the process determines whether the aircraft is on the ground (operation 1306). If the aircraft is not on the ground, the process then displays an extended centerline (operation 1308).

A determination is made as to whether a flag is set (operation 1310). In these examples, the flag indicates whether a takeoff is set for the aircraft. If a flag is set, the process disables and removes the runway remaining billboard indicators (operation 1312). In operation 1312, the runway remaining billboard indicators are disabled from being displayed. Additionally, if runway remaining billboard indicators are displayed, these indicators are removed from the display. The process then unsets the flag (operation 1314).

Thereafter, a determination is made as to whether the altitude of the aircraft is above a first selected altitude (operation 1316). In this example, the first selected altitude may be about 2,000 feet. Of course, other altitudes may be used. If the altitude is above 2,000 feet, the process then enables the runway remaining billboard indicators (operation 1318), with the process then returning to operation 1300.

With reference again to operation 1316, if the altitude of the aircraft is not above the first selected altitude, a determination is made as to whether the runway remaining billboard indicators are enabled (operation 1320). If the runway remaining billboard indicators are not enabled, the process also returns to operation 1300. Otherwise, a determination is made as to whether the altitude of the aircraft is below a second selected altitude (operation 1322). In this example, the second selected altitude is about 200 feet.

If the altitude of the aircraft is below the second selected altitude, the process displays the runway remaining billboard indicators (operation 1324), with the process then returning to operation 1300. If the altitude of the aircraft is not below the second selected altitude, the process also returns to operation 1300 as described above.

With reference again to operation 1310, if the flag is not set, the process continues to operation 1316 as described above. With reference again to operation 1306, if the aircraft is on the ground, the process sets a flag (operation 1326). The process then removes the extended centerline from the number of graphical indicators (operation 1328). The process then displays runway remaining billboard indicators (operation 1330), with the process then returning to operation 1300.

Figure 14:
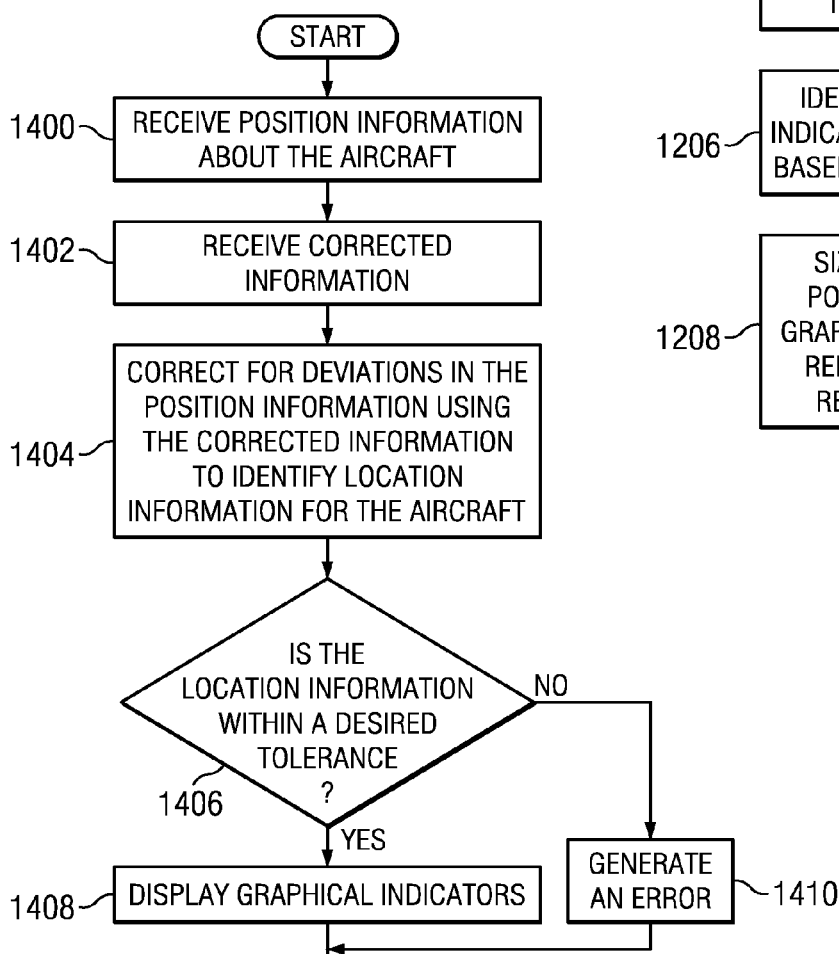
FIG. 14 is an illustration of a flowchart of a process for obtaining location information for displaying graphical indicators in accordance with an advantageous embodiment.

With reference now to FIG. 14, an illustration of a flowchart of a process for obtaining location information for displaying graphical indicators is depicted in accordance with an advantageous embodiment. The process illustrated in FIG. 14 is an example of a process that may be implemented in display process 326 in FIG. 3.

The process begins by receiving position information about the aircraft (operation 1400). In operation 1400, the position information about the aircraft may be received from a number of different devices. For example, without limitation, a global positioning system receiver, an inertial reference unit, and an altitude heading reference unit are examples of devices that may be used.

The process also receives corrected information (operation 1402). The corrected information may be received from a number of different sources. For example, without limitation, ground-based systems may provide corrections to global positioning information generated by global positioning systems. This information may be received over radio frequency signals in these examples.

The process then corrects for deviations in the position information using the corrected information to identify location information for the aircraft (operation 1404). Thereafter, the process determines whether the location information is within a desired tolerance (operation 1406). If the location information is within a desired tolerance, the process then uses the location information to display the graphical indicators (operation 1408), with the process terminating thereafter.

If the location information is not within the desired tolerance, then an error is generated (operation 1410), with the process terminating thereafter. This error is used by the process to indicate that the graphical indicators corresponding to features of the runway should not be displayed. In this manner, the possibility that graphical indicators will be displayed for a runway with accuracy less than desired may be reduced.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments provide a method and apparatus for displaying information about runways. In a number of advantageous embodiments, a runway is identified for an aircraft when the aircraft is within a selected distance of the runway. A number of graphical indicators is displayed on a display in the flight deck. The number of graphical indicators corresponds to a number of features of the runway present in a field of view for the eye reference point in the flight deck.

With one or more of the different advantageous embodiments, landing on a runway at different visibility conditions may become less dependent on the ground infrastructure. With the different advantageous embodiments, a flight crew of an aircraft may obtain the information needed to land on a runway, even though the lights or ground infrastructure at the airport do not support providing the information with a particular level of visibility or ceiling. As a result, the different advantageous embodiments may provide increased flexibility for when aircraft are able to land on a runway.

The different advantageous embodiments can take the form of an entirely hardware embodiment, an entirely software embodiment, or an embodiment containing both hardware and software elements. Some embodiments are implemented in software, which includes, but is not limited to, forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories, which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems, remote printers, or storage devices through intervening private or public networks. Non-limiting examples are modems and network adapters and are just a few of the currently available types of communications adapters.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for displaying information about runways, the method comprising:
   identifying a runway for an aircraft when the aircraft is within a selected distance of the runway; and
   displaying a number of graphical indicators on a display in a flight deck, wherein the number of graphical indicators corresponds to a number of features of the runway present in a field of view for an eye reference point in the flight deck, the number of graphical indicators including a centerline of the runway, the displaying including a first number of rectangles for the centerline not filled when the aircraft is at a first distance from the runway, and changing the display of the first number of rectangles to displaying a second number of rectangles for the centerline in which the second number of rectangles alternates between being filled and not filled when the aircraft is at a second distance from the runway.

2. The method of claim 1, wherein the display is a first display and further comprising:
   displaying at least the number of graphical indicators in the first display on a second display in the flight deck, wherein flight information is displayed on the second display.

3. The method of claim 1 wherein the step of displaying the number of graphical indicators on the display in the flight deck, wherein the number of graphical indicators corresponds to the number of features of the runway present in the field of view for the eye reference point in the flight deck comprises:
   displaying the number of graphical indicators on the display in the flight deck, wherein the number of graphical indicators corresponds to an outline of the runway as present in the field of view for the eye reference point in the flight deck.

4. The method of claim 1, wherein the number of additional graphical indicators is a first number of additional graphical indicators and wherein the step of displaying the number of graphical indicators on the display in the flight deck, wherein the number of graphical indicators corresponds to the outline of the runway as present in the field of view for the eye reference point in the flight deck further comprises:

displaying a second number of additional graphical indicators on the display in the flight deck, wherein the second number of additional graphical indicators corresponds to an extension of the centerline of the runway as present in the field of view for the eye reference point in the flight deck.

5. The method of claim 3, wherein the step of displaying the number of graphical indicators on the display in the flight deck, wherein the number of graphical indicators corresponds to the outline of the runway as present in the field of view for the eye reference point in the flight deck further comprises:
displaying a number of additional graphical indicators on the display in the flight deck, wherein the number of additional graphical indicators corresponds to a number of runway remaining billboards on the runway as present in the field of view for the eye reference point in the flight deck.

6. The method of claim 1, wherein the step of displaying the number of additional graphical indicators on the display in the flight deck, wherein the number of additional graphical indicators corresponds to the centerline of the runway as present in the field of view for the eye reference point in the flight deck comprises:
displaying a third number of rectangles for the centerline in which the third number of rectangles is filled at a third distance from the runway.

7. The method of claim 1, wherein the number of graphical indicators is displayed on a heads up display on a window in the flight deck.

8. The method of claim 1, wherein the step of displaying the number of additional graphical indicators on the display in the flight deck, wherein the number of additional graphical indicators corresponds to the centerline of the runway as present in the field of view for the eye reference point in the flight deck comprises:
displaying a number of runway touchdown markers indicating a location on the runway where the aircraft should touch the runway when landing.

9. An apparatus comprising:
a display in a flight deck;
a storage device containing program code; and
a processor unit configured to run the program code to identify a runway for an aircraft when the aircraft is within a selected distance of the runway; and display a number of graphical indicators on the display in the flight deck, wherein the number of graphical indicators corresponds to a number of features of the runway present in a field of view for an eye reference point in the flight deck, the number of graphical indicators including a centerline of the runway, the display including a first number of rectangles for the centerline not filled when the aircraft is at a first distance from the runway, and changing the display of the first number of rectangles to displaying a second number of rectangles for the centerline in which the second number of rectangles alternates between being filled and not filled when the aircraft is at a second distance from the runway.

10. The apparatus of claim 9, wherein the display is a first display and wherein the processor unit is further configured to run the program code to display at least the number of graphical indicators from the first display on a second display in the flight deck, wherein flight information is displayed on the second display.

11. The apparatus of claim 9 wherein in being configured to run the program code to display the number of graphical indicators on the display in the flight deck, wherein the number of graphical indicators corresponds to the number of features of the runway present in the field of view for the eye reference point in the flight deck, the processor unit is configured to run the program code to display the number of graphical indicators on the display in the flight deck, wherein the number of graphical indicators corresponds to an outline of the runway as present in the field of view for the eye reference point in the flight deck.

12. The apparatus of claim 9, wherein the number of additional graphical indicators is a first number of additional graphical indicators and wherein in being configured to run the program code to display the number of graphical indicators on the display in the flight deck, wherein the number of graphical indicators corresponds to the outline of the runway as present in the field of view for the eye reference point in the flight deck, the processor unit is configured to run the program code to display a second number of additional graphical indicators on the display in the flight deck, wherein the second number of additional graphical indicators corresponds to an extension of the centerline of the runway as present in the field of view for the eye reference point in the flight deck.

13. The apparatus of claim 11, wherein in being configured to run the program code to display the number of graphical indicators on the display in the flight deck, wherein the number of graphical indicators corresponds to the outline of the runway as present in the field of view for the eye reference point in the flight deck, the processor unit is configured to run the program code to display a number of additional graphical indicators on the display in the flight deck, wherein the number of additional graphical indicators corresponds to a number of runway remaining billboards on the runway as present in the field of view for the eye reference point in the flight deck.

14. The apparatus of claim 9, wherein in being configured to run the program code to display the number of additional graphical indicators on the display in the flight deck, wherein the number of additional graphical indicators corresponds to the centerline of the runway as present in the field of view for the eye reference point in the flight deck, the processor unit is configured to run the program code to display the second number of rectangles for the centerline in which the number of rectangles is filled at a third distance from the runway.

15. The apparatus of claim 9, wherein the display is a heads up display in which the number of graphical indicators is displayed on the heads up display on a window in the flight deck.

16. A computer program product for displaying information about runways, the computer program product comprising:
a non-transitory computer recordable storage medium;
program code, stored on the computer recordable storage medium, for identifying a runway for an aircraft when the aircraft is within a selected distance of the runway; and
program code, stored on the computer recordable storage medium, for displaying a number of graphical indicators on a display in a flight deck, wherein the number of graphical indicators corresponds to a number of features of the runway present in a field of view for an eye reference point in the flight deck, the number of graphical indicators including a centerline of the runway, the displaying including a first number of rectangles for the centerline not filled when the aircraft is at a first distance from the runway, and changing the displaying of the first number of rectangles to displaying a second number of rectangles for the centerline in which the second number of rectangles alternates between being filled and not filled when the aircraft is at a second distance from the runway.

17. The computer program product of claim 16, wherein the display is a first display and further comprising:
    program code, stored on the computer recordable storage medium, for displaying at least the number of graphical indicators from the first display on a second display in the flight deck, wherein flight information is displayed on the second display.

18. The computer program product of claim 16 wherein the program code, stored on the computer recordable storage medium, for displaying the number of graphical indicators on the display in the flight deck, wherein the number of graphical indicators corresponds to the number of features of the runway present in the field of view for the eye reference point in the flight deck comprises:
    program code, stored on the computer recordable storage medium, for displaying the number of graphical indicators on the display in the flight deck, wherein the number of graphical indicators corresponds to an outline of the runway as present in the field of view for the eye reference point in the flight deck.

19. The method of claim 1, wherein the display changes from displaying the first number of rectangles to displaying the second number of rectangles when the aircraft is between about 1000 feet to about 3000 feet from a threshold of the runway.

* * * * *